Figure 3:
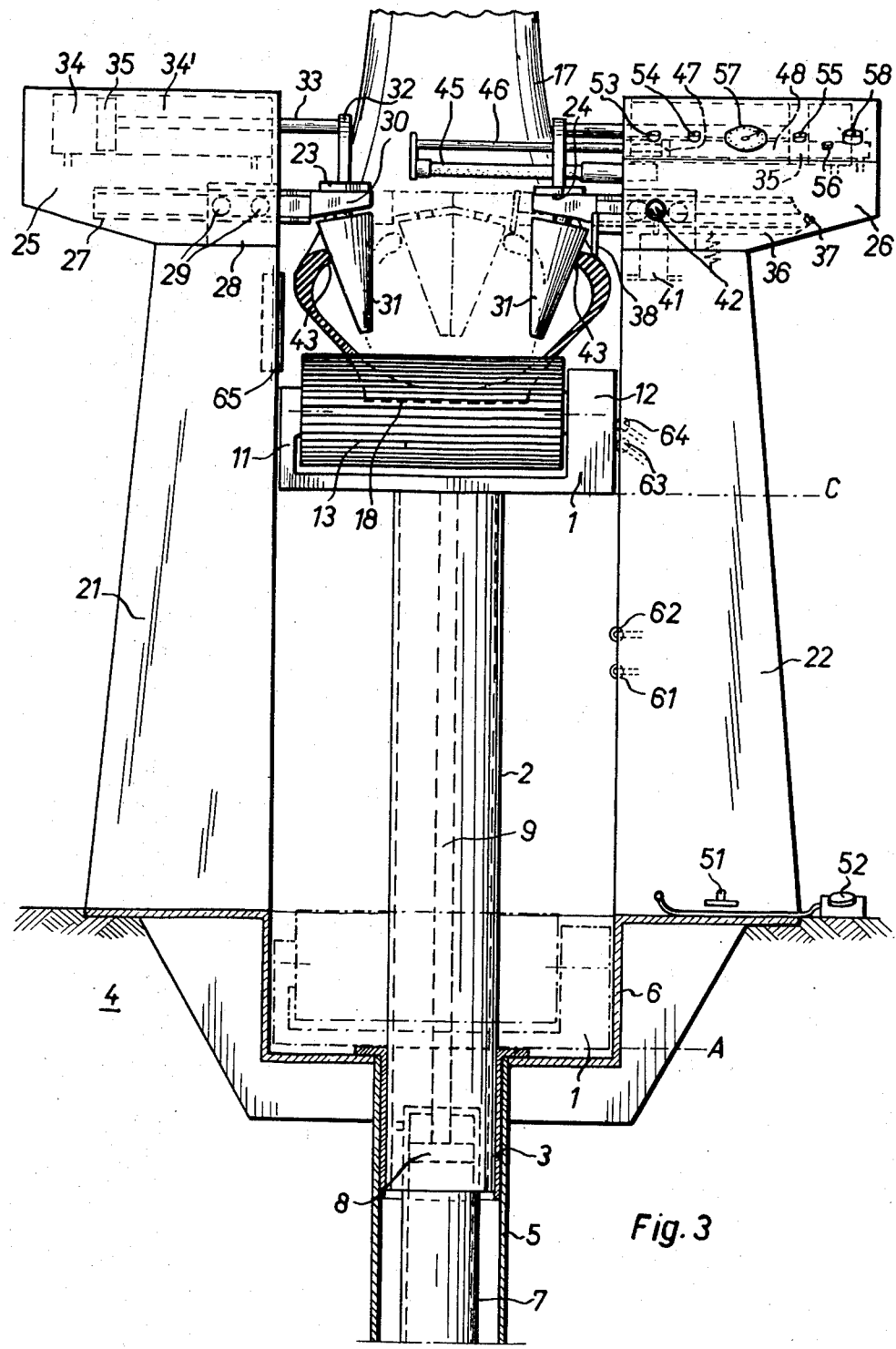

United States Patent

[11] 3,542,340

| | | |
|---|---|---|
| [72] | Inventor | Johann Peisl<br>Wetzikon, Switzerland |
| [21] | Appl. No. | 754,253 |
| [22] | Filed | Aug. 21, 1968 |
| [45] | Patented | Nov. 24, 1970 |
| [73] | Assignee | Mondo Pneuhandels and<br>Gummiverwertungs Ag Wetzikon<br>Wetzikon, Switzerland |
| [32] | Priority | Aug. 24, 1967 |
| [33] | | Switzerland |
| [31] | | No. 11886/67 |

[54] APPARATUS FOR THE CONTROL AND EXAMINATION OF WHEEL TYRES
14 Claims, 4 Drawing Figs.

[52] U.S. Cl. .................................................... 254/50.3
[51] Int. Cl. ....................................................... B60c 25/14
[50] Field of Search........................................... 254/50.1-
—50.4; 81/15.3; 157/13(WH); 144/288.1

[56] References Cited
UNITED STATES PATENTS

| | | | |
|---|---|---|---|
| 3,052,447 | 9/1962 | Mishler ....................... | 254/50.2 |
| 3,130,957 | 5/1964 | Branick ....................... | 254/50.3 |

*Primary Examiner*—Robert C. Riordon
*Assistant Examiner*—David R. Melton
*Attorney*—Harness, Dickey and Pierce ABSTRACT: Apparatus for examination of the condition of used wheel tyres comprises a vertically movable table with two parallel spaced motor driven rollers for receiving a tyre to be examined placed in vertical position with the tread surface on the rollers which transmit rotary motion to the tyre. Clamping and spreading devices are placed on the top of two pedestals arranged on either side of the table. The clamping and spreading devices carry tools which can be moved towards each other against the side walls of the tyre placed on said rolls, or engaged in the interior of the tyre and moved away from each other to spread the side walls of the tyre apart from each other.

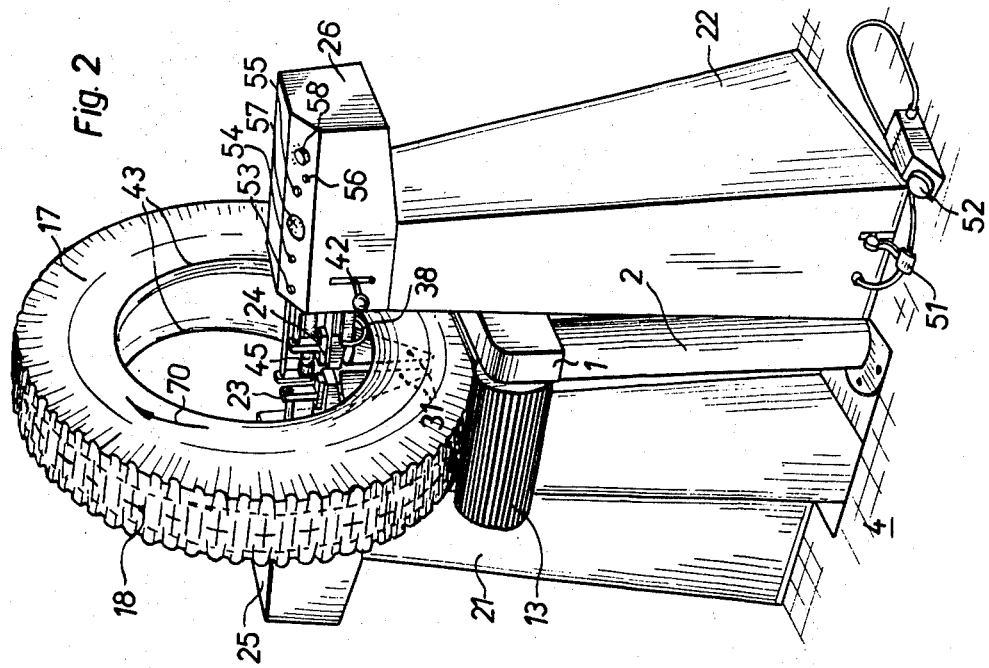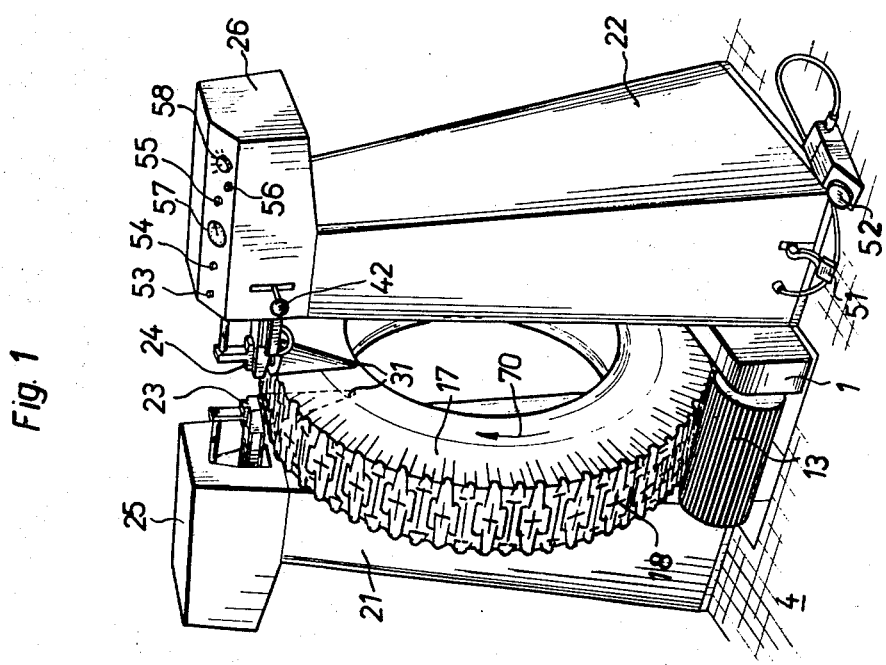

APPARATUS FOR THE CONTROL AND EXAMINATION OF WHEEL TYRES

The present invention concerns apparatus for the control and examination of used wheel tyres.

In order to be able to decide whether a used tyre, e.g. an automobile or truck tyre, is suitable for new rubber coating (new gumming of the tread surface along or passing over the shoulder) or renewed all around (from bead to bead), or whether it merely represents scrap, the tyre must be thoroughly examined on the outside as well as on the inside (tread surface as well as sides) for any possible damage, fatigue, age etc., such as for example punctures, cuts, crevices, ruptures, previous fabrics, bead damage and the like. When a tyre is declared to be scrap, it can only be used for making door mats, washers, towing ropes, etc.

For such a control, in spite of spreading machines already on the marker—they only partly satisfy requirements—still today the tyre is frequently examined, displaced, and turned by hand; tools such as clamps, etc. are applied to the bead along the circumference of the tyre, which tools spread apart the tyre and expose its interior for examination. This procedure, however not only is exerting and fatiguing due to the considerable weights of the tyres, particularly truck size tyres, but above all also time consuming, so that such an examination amounts to considerable expenditure as compared with the value of the used tyre which may possibly be useful as scrap only.

The outside of the tyre is examined by the eye; visible damages are more closely inspected by means of a broach or the like, which always results in a somewhat doubtful test. The mechanic spreaders hitherto known are of complicated use, do not operate sufficiently rapid and neglect the possibility of a close examining the tread surface and the beads. This is true primarily for truck tyre spreaders.

It is the object of the present invention to avoid the mentioned drawbacks and to provide apparatus by means of which tyres of any size can be brought quickly and continuously, without expenditure of force in convenient positions of inspections.

According to the invention the apparatus for the control of wheel tyres comprises a vertically adjustable table arranged for up and down movement between lower and upper extreme positions, two parallel spaced rolls rotatably mounted in said table and adapted to carry a tyre for inspection in substantially vertical position, and two oppositely disposed clamping and spreading devices coaxially arranged for horizontal sliding movement towards and away from each other, said devices including tyre clamping and spreading tools adapted to be applied against the external sides of the tyre in position for inspection with said table in a lower position, and against the internal sides or the beads of the tyre with the table in a higher position.

Figure 4:
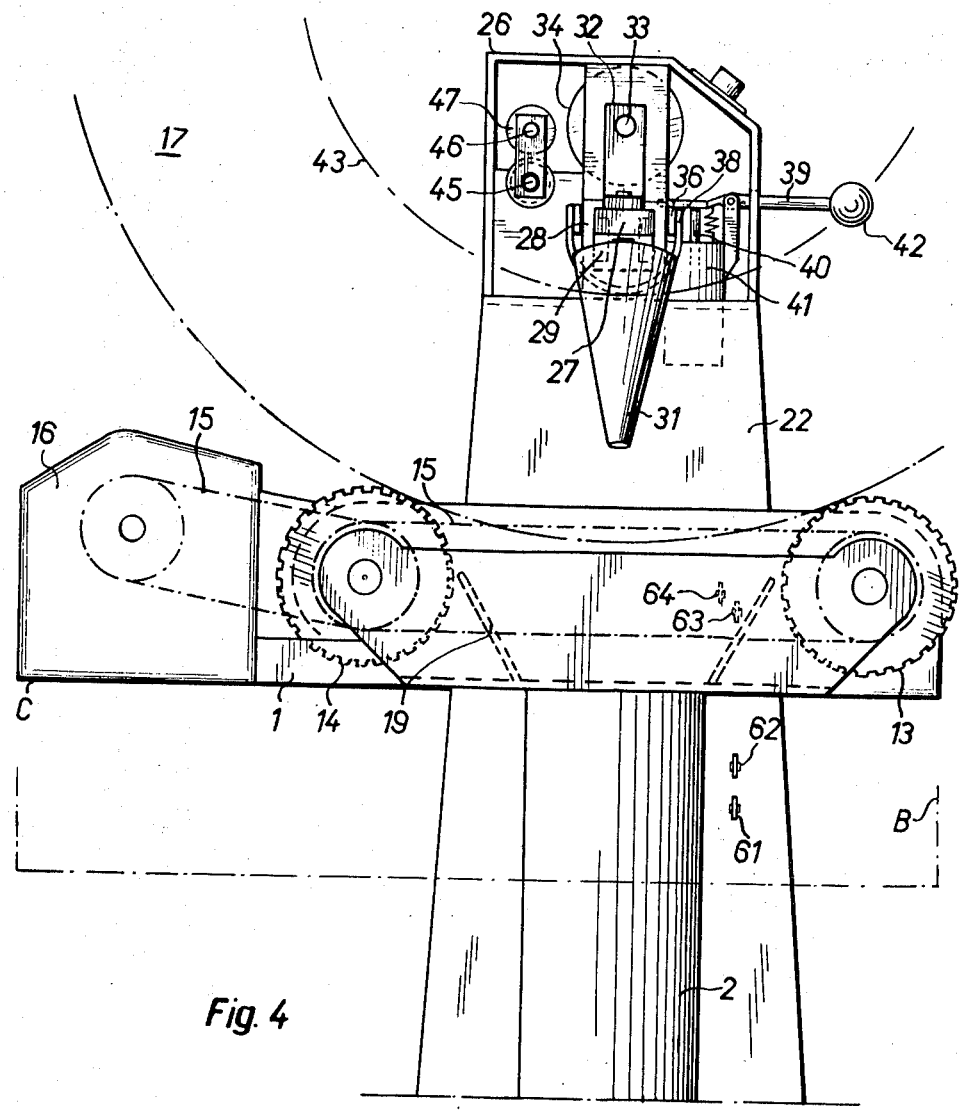

Apparatus for the control of used wheel tyres according to the invention, will now be more fully described with reference to the accompanying drawings, in which:

FIG. 1 is a perspective view of an apparatus according to the invention in position of operation for controlling the external side of a tyre, FIG. 2 represents the apparatus according to FIG. 1 in operating position for controlling the internal side of the tyre, FIG. 3 is a front elevation of the apparatus partly shown in section, FIG. 4 is a side elevation of the apparatus.

The apparatus represented in FIGS. 1 to 4 comprises a working table 1 which is secured to the upper end of a vertical tubular column 2. The tubular column 2 is guided in a tubular insert 3 which is introduced in a pipe 3 vertically sunk in the floor 4. The tubular column 2 can be raised or lowered in vertical direction between two extreme positions A and C of the table 1, represented in FIG. 3 in dash and dot lines or full lines, respectively. In the lower extreme position A the table 1 is situated according to FIG. 3 in a socket tray 6. For raising and lowering the table 1 according to FIG. 3 a pneumatic cylinder 7 is accommodated in the interior of the pipe 5 inserted in the floor. The cylinder 7 contains a reciprocating piston 8 actuated by compressed air. The piston 8 is connected with the table 1 by a piston rod 9 extending in the interior of the tubular column 2.

According to FIGS. 3 and 4 two rolls 13 and 14 provided with longitudinal grooved surfaces and having horizontal and parallel axes are rotatably mounted in spaced relation in opposite side walls 11 and 12 of the table 1. The rolls 13 and 14 are rotatably driven by a chain drive 15 (FIG. 4) arranged in one of the side walls 12; a diagrammatically represented encased electromotor 16 fixed to the table 1 is provided for driving the chain 15. As is visible from FIGS. 1 and 2, the rolls 13 and 14 serve as support for a vertically placed wheel tyre 17 which is resting by its tread surface 18 on the grooved surfaces of the rolls 13, 14. The rolls 13, 14, rotating in the same direction, transmit a rotary movement to the tyre 17. Foreign bodies, such as dirt, stones, etc. which may fall off the tyre are collected in the interior of the table 1 by a collecting pan 19 (FIG. 4). For reasons of safety the front roll 13 (FIGS. 1 and 2) can be covered by a guard plate not shown.

According to FIGS. 1 to 3 two encased pedestals 21 and 22 are each fixed to the floor 1 at either side of the table 1. Each pedestal 21 and 22 carries in its upper portion a horizontally slidable clamping and spreading device 23 and 24, respectively, for the tyre 17 placed on the table 1, the devices 23 and 24 being accommodated each in a casing 25 and 26, respectively, and arranged coaxially with each other.

With reference to FIG. 3 and 4 the conforming construction of the clamping and spreading devices 23, 24 will now be explained in of detail. the rolls Each of the two devices 23, 24 comprises a carrier rail 27 which is formed as a double T-rail in the represented example of execution and is slidably mounted on the pedestal 21 or 22 on several rolls 29 arranged in a bearing block 28. Both carrier rails 27 comprise an end plate 30 at the two ends facing each other, in each of which plates a conical downwardly tapering roll 31 is mounted to be freely rotatable. A vertical bracket 32, moreover, is fixed to each end plate 30, to which bracket is connected a horizontally movable actuating rod 33 for the carrier rail 27. Each of the two actuating rods 33 is formed as a piston rod of a double acting piston 35 arranged in a cylinder provided with two air pressure spaces 34, 34'.

According to FIG. 3 a fork 36 is hinged to the end of one carrier rail 27 situated in the casing 26, the fork being provided with a fulcrum point 37. A U-shaped bracket 38 (FIG. 4) is secured to the free ends of the fork 36 which extends close to the roll 31. A hinged lever 39 is spring loaded and urges the fork 36 downwardly. Moreover, the actuating rod 40 of a valve 41 (FIG. 3) is fixed to the lever 39. The lever 39 passes through a slit in the wall of the casing 26 to the outside and is provided with a ball handle 42 at its end. The fork 26 is of such length that the bracket 38 is situated in the region of one of the two beads 43 of the tyre 17.

According to FIGS. 3 and 4 a tube-shaped lamp 45, e.g. a fluorescence tube, is mounted in one casing 26 for displacement parallel to the clamping and spreading devices 23, 24. For moving the lamp a lamp socket is connected with an actuating rod 46 which also is formed as a piston rod of a piston 48 arranged in a compressed air cylinder 47.

The pedestal 22 and the casing 26 comprise different actuating members. A pedal 51 is arranged at the foot of the pedestal 22 (FIGS. 1, 2). Upon actuation of the pedal the table 1 is caused to be raised. A foot operated switch 52 is connected to a cable leading into the pedestal 22. Actuation of this switch starts the motor (FIG. 4) to drive the rolls 13 and 14.

A first pushbutton 53 is arranged at the casing 26, the actuation of which causes the two clamping and spreading devices 23, 24 to be moved simultaneously to approach each other. A further pushbutton 54 serves to simultaneously move the clamping and spreading devices 23, 24 in the opposite direction to move away from each other. A third pushbutton 55 actuates a switch for starting the driving motor 16 (FIG. 4), this switch being electrically connected in parallel with the foot switch 52 (FIGS. 1, 2). A fourth pushbutton 56 actuates a switch for turning the lamp 46 on or off. The pressure of the compressed air raising and lowering the table 1 and moving the clamping and spreading devices 23, 24, as well as the lamp 45 can be checked at a pressure gauge 57.

Further, a rotary control button 58 is arranged on the casing 26 by means of which the speed of rotation of the driving motor 16 (FIG. 4) for the rolls 13 and 14 can be adjusted stepwise or continuously. The lever 39 projecting out of the casing 26 and provided with the ball handle 42 acts on the valve 41 when it is pressed down.

Further actuating members diagrammatically represented in FIGS. 3 and 4, are arranged on the inner side wall of the one pedestal 22. Thus, a first tipping lever 61 is actuated upon raising the table 1 by the passing table and then causes the two clamping and spreading devices 23, 24 to be moved in the direction towards each other until their rolls 31 make contact. A second tipping lever is only actuated by the passing table 1 upon lowering the table. It then causes the two clamping and spreading devices 23, 24 to move away from each other. A third tipping lever 53 is also actuated by the passing table 1 and closes the circuit of the driving motor for the rolls 13, 14 when the table moves upwardly, or opens it when the table moves downwardly. A fourth tipping lever 64, also actuated by the table 1 opens a flow valve in a compressed air conduit leading to a compressed air cylinder 47 of the lamp 45, when the table moves upwardly, or closes the valve when the table moves downwardly.

According to FIG. 3 guide rolls 65 having vertical axes can be arranged at one or both inner side walls of the pedestals 21 and 22, which rolls prevent a direct contact of the tyre 17 with the side walls.

In FIG. 1 the described apparatus is represented in a first operating position which is provided for the control of the external side of a tyre, i.e. its tread surface and the beads. The examination of the side walls is effected by the eye. The table 1 is at this time in its lower extreme position. The vehicle tyre 17 is placed with its tread surface 18 on the rolls 13, 14, only the front roll 13 being visible in FIG. 1. The two clamping and spreading devices 23, 24 are situated in the position of their greatest mutual distance, which is obtained by actuation tread the pushbutton 54 on the casing 26. By actuating the foot switch 52 and continuously maintaining the switch closed, the driving motor of the rolls 13, 14 is started, and kept running so that the tyre 17 rotates in the direction of the arrow 70 at a speed chosen by setting the rotary button 58. At the same time the slowly revolving tread surface 18 of the tyre 17 is controlled by the eye, the foot being left on the foot operated switch 52. As soon as a defective place, e.g. a cut, is discovered in the tread surface, the foot is removed from the foot switch 52, whereby the driving motor is disconnected from the current supply and the tyre 17 stops. The defective place, if necessary, can be marked with a chalk. In order to be able to better judge the extent of the damage, the defective place then can be brought into the uppermost position i.e. into the vertical connecting plane of the two clamping and spreading devices 3, 24 by again pushing the foot switch 52. Then both clamping and spreading devices 23, 24 are pneumatically displaced and approached to each other by actuation of the pushbutton 53, so that their rolls 31 acting as clamping tools, are applied against the side walls of the tyre and bulge the thread surface 18 upwardly. The defective place of the tread surface thereby is spread apart and the extent of damage can be better judged.

By a repeated actuation of the pushbutton 54 the clamping and spreading devices 23, 24 are again moved away from each other, whereafter the control of the tyre and also of its side walls can be continued while the foot switch 52 is depressed again. It is not necessary to move the clamping and spreading devices 23, 24 completely into their outer end position; their rolls 31 rather can remain in contact with the side walls of the tyre 17 and can exert a slight clamping action also upon rotation of the tyre 17.

It is also not necessary that the tyre 17, upon clamping is situated exactly on the level of and between the rolls 31 of the clamping and spreading devices 23, 24, so that the table 1 generally can remain in its lowermost position destined for the greatest tyre diameter. For the exceptional control of tyres of substantially smaller diameter, however, the table 1 cam be brought to the desired height pneumatically by actuation of the foot pedal 51.

The operating position of the apparatus shown in FIG. 2 permits control of the internal side of the tyre 17. The table 1 is raised into this higher position by actuation of the foot pedal 51, one of the beads 43 of the tyre acting on the bracket 38 (FIG. 3) and thereby stops the lifting movement of the table 1 in the manner subsequently explained. Moreover, upon raising the table 1, as is also subsequently explained, the clamping and spreading devices 23, 24 will first be moved away from each other and then approached each other through the opening of the tyre in such manner, that in the represented operating position their rolls 31 are situated in the interior of the tyre between its sidewalls. By actuation of the pushbutton 54 the clamping and spreading devices 23, 24 are again moved away from each other, so that their rolls 31, then acting as spreading tools, are pressed from the inside against the beads 43 of the tyre and spread the latter apart. At the same time the tube-shaped lamp 54 is horizontally extended into the opening of the tyre 17 and lighted by actuation of the pushbutton 56. By actuation of the foot switch 52 or of the pushbutton 55 the driving motor for the rolls 13, 14 is started, so that the tyre 17 rotates in the direction of the arrow 70 at the speed set on the rotary button 58. The spread apart and illuminated inner side of the tyre 17 now can be inspected upon rotation of the tyre, while it is possible to interrupt anytime the rotary movement of the tyre by the foot switch 52 or the rotary button 55 for a closer inspection of a located damage.

In order to remove the controlled tyre 17 from the apparatus after examination, first, the lamp 45 is retracted into the casing 26 and the two rolls 31 are brought in contact with each other by moving the clamping and spreading devices 23, 24. Afterwards the table 1 is lowered. As soon as the rolls 31 are approximately in the centre of the tyre opening, the clamping and spreading devices 23, 24 will again be moved completely away from each other, so that now the table 1 can be lowered without obstruction until its lowermost position, and the tyre 17 can be pushed off the rolls 13, 14.

The actuation members 61 to 64 diagrammatically shown in FIG. 3 are provided in order to cause an automatic actuation and locking of the clamping and spreading devices 23, 24, as well as of the illuminating device 45 upon raising and lowering the table 1 into and out of its upper operating position, so that these devices cannot make contact with the vertically moving tyre 17. With reference to FIGS. 3 and 4 the manner of operation of the mentioned actuating members is explained in the following.

By actuation of the foot pedal 51 the lifting movement of the table 1 from its lower extreme position A is released, air flowing from a valve connected to the foot pedal 51 into the cylinder 7. During this lifting movement, the clamping and spreading devices 23, 24 are retracted into the casings 25, 26. In a higher position B the tilting lever 61 is actuated by the passing table, but the tilting lever 62 is not actuated. Thereby air flows through a valve connected to the tilting lever 61 into the cylinder portions 34 and moves the pistons 35 of both clamping and spreading devices 23, 24 towards each other within the opening of the tyre 17. When one of the beads 43 strikes against the bracket 33, the valve 41 is closed and thereby the supply of air to the valve 41 interrupted, so that the table 1 stops in the upper extreme position C. A short moment prior to the stop, the tilting lever 63 is actuated by the table 1, which lever, by means of a switch connected with it, closes the circuit of the driving motor 16. Also the tilting lever 64 is actuated in this position of the table 1 and opens a stop valve in a pressure air conduit leading to the cylinder 47 of the illumination device 45. Since this conduit, however, is not yet under pressure, no movement of the illumination device 45 is produced.

By operation of the pushbutton 54 now pressure air flows through a valve into the cylinder portions 34', so that the clamping and spreading devices 23, 24 are moved away from each other, and the rolls 31 cause a spreading of the beads 43 of the tyre 17. At the same time exhaust air flows out of the cylinder portions 34 into the cylinder 47 of the illuminating device 45, to move this latter out of the casing 26 into the opening of the tyre 17.

When lowering the table 1 the operations are reversed. By actuation of the pushbutton 53 compressed air again flows into the cylinder portions 34, so that the clamping and spreading devices 23, 24 are moved towards each other. The exhaust air of the cylinder portions 34' causes the illuminating device 45 to return into the casing 26. Upon actuation of the push button 53 also a valve is opened which permits the air to escape from the cylinder 7, so that the table 1 starts its downward movement. Shortly afterwards the table 1 actuates the tilting lever 64, whereby the stop valve in the pressure conduit to the cylinder 47 of the illuminating device 45 is again closed, so that the illuminating device can no longer be moved. The tilting lever 63 is also actuated by the table 1, whereby the motor 16 is switched off. Approximately in the position B of the table the tilting lever 62 will be actuated by the table 1 to open a valve connected to the lever, whereby air is caused to flow into the cylinder portions 34 and to move the clamping and spreading devices 23, 24 completely away from each other, so that the table 1 can be lowered without restrain into the lower extreme position A, together with the tyre resting on the table.

Instead of the pneumatic operation of the displacement, actuation and locking devices for the table 1, the clamping and spreading devices 23, 24 and the illuminating device 45 as described by way of example, it is obviously possible to provide also hydraulic or electric means for operation of these devices.

The described apparatus confines the activity of the operating and control personnel to the actuation of switches, pushbuttons and the like, as well as to the control of the tyre to be effected by the eye. Thereby not only the control is facilitated and accelerated, but also the danger of accidents is substantially reduced.

At the side of the casing 25 facing the opposite casing 26 a mirror can be arranged above the actuating rod 33. The mirror renders visible the entire inner side of the tyre to the person standing in front of pedestal 22 and in this manner essentially accelerates the examination procedure.

I claim:

1. Apparatus for the control of used wheel tyres, comprising a vertically adjustable table arranged for up and down movement between lower and upper extreme positions, two parallel spaced rolls rotatably mounted in said table and adapted to carry a tyre for inspection in substantially vertical position, and two oppositely disposed clamping and spreading devices coaxially arranged for horizontal sliding movement towards and away from each other, said devices including tyre clamping and spreading tools adapted to be applied against the external sides of the tyre in position for inspection with said table in a lower position, and against the internal sides or the beads of the tyre with the table in a higher position.

2. Apparatus according to claim 1, in which said table is carried by the upper end of a tubular column vertically movable in a tubular guide inserted into the floor surface, a pressure fluid operated piston being operatively connected to said tubular column and table for vertically moving the table.

3. Apparatus according to claim 1, in which said rotatably mounted rolls are power driven for rotation in the same direction and at the same speed to transmit a rotary movement to said tyre to be controlled and placed on the rollers.

4. Apparatus according to claim 3, in which a pedestal is arranged on the floor surface at either side of said table, each pedestal carrying one of said clamping and spreading devices, the pedestals being of such height that the clamping and spreading devices are adapted to be pressed against the highest point of the external walls of the tyre to be controlled and placed on said rolls of the table with the table in its lower extreme position.

5. Apparatus according to claim 4, in which each clamping and spreading device includes a horizontally movable tool carrier, the two tool carriers of the clamping devices being horizontally alined with each other and movable towards and away from each other, the end of each tool carrier facing the opposite tool carrier carrying a rotatably mounted tool having a contact surface adapted to be applied against the wall of the tyre to be controlled and to transmit rotary motion from the tyre to said tool.

6. Apparatus according to claim 5, in which the tools of both tool carriers are formed as downwardly directed cones, the axes of which form the axes of rotation of the tools and are converging downwardly in a direction inclined relatively to the vertical.

7. Apparatus according to claim 5, in which for simultaneous movement of both clamping and spreading devices each tool carrier is connected with a piston rod comprising a fluid operated piston.

8. Apparatus according to claim 4, in which an illuminating device, such as a tube-shaped lamp, is arranged on one pedestal and adapted to be moved horizontally into the opening of the tyre when the table is in its upper position.

9. Apparatus according to claim 8, in which a piston rod connected with a fluid operated piston is provided for moving the illuminating device.

10. Apparatus according to claim 5, in which stopping means operable by the tyre are hingedly connected to one of said tool carriers for the upwardly directed movement of the table.

11. Apparatus according to claim 10, in which said stopping means are connected with a valve for controlling the fluid pressure acting on said fluid operated piston of the table.

12. Apparatus according to claim 8, in which actuating members are arranged on one of said pedestals for producing movement of said table, said clamping and spreading devices, said illuminating device and said rolls carrying the tyre.

13. Apparatus according to claim 12, in which said actuating members for moving the table, the clamping and spreading devices and the illuminating device are formed as valves operated by tilting levers and pushbuttons for controlling the fluid pressure acting on the piston operatively connected with said table, said clamping and spreading devices, and said illuminating device.

14. Apparatus according to claim 12, in which the actuating members for the drive of said rolls are formed as electric switches.